US007349803B2

(12) United States Patent
Belenkii et al.

(10) Patent No.: US 7,349,803 B2
(45) Date of Patent: Mar. 25, 2008

(54) DAYTIME STELLAR IMAGER

(75) Inventors: Mikhail Belenkii, San Diego, CA (US); Donald G. Bruns, San Diego, CA (US); Vincent A Rye, Oceanside, CA (US); Timothy Brinkley, La Jolla, CA (US)

(73) Assignee: Trex Enterprises Corp., San Diego, CA (US)

( * ) Notice: Subject to any disclaimer, the term of this patent is extended or adjusted under 35 U.S.C. 154(b) by 396 days.

(21) Appl. No.: 11/106,744

(22) Filed: Apr. 15, 2005

(65) Prior Publication Data
US 2006/0085129 A1    Apr. 20, 2006

Related U.S. Application Data

(60) Provisional application No. 60/619,858, filed on Oct. 18, 2004.

(51) Int. Cl.
*G01C 21/00* (2006.01)

(52) U.S. Cl. ....................... 701/222; 701/200

(58) Field of Classification Search ............... 701/200, 701/220–223; 244/3.15, 3.18; 33/227, 268; 73/178
See application file for complete search history.

(56) References Cited

U.S. PATENT DOCUMENTS

2006/0085130 A1*  4/2006  Belenkii et al. ............ 701/222
2007/0038374 A1*  2/2007  Belenkii et al. ............ 701/222

* cited by examiner

*Primary Examiner*—Yonel Beaulieu
(74) *Attorney, Agent, or Firm*—John R Ross

(57) ABSTRACT

An automatic celestial navigation system for navigating both night and day by observation of K-band or H-band infrared light from multiple stars. A preferred embodiment uses three telescopes with each of the three telescopes rigidly mounted with respect to each other and rigidly mounted on a movable platform such as a ship or airplane with each telescope being directed at a substantially different portion of sky. Telescope optics focuses, onto the pixel array of a sensor, H-band or K-band light from stars in the field of view of each telescope. The system also includes an inclinometer, an accurate timing device and a computer processor having access to cataloged infrared star charts.

16 Claims, 11 Drawing Sheets

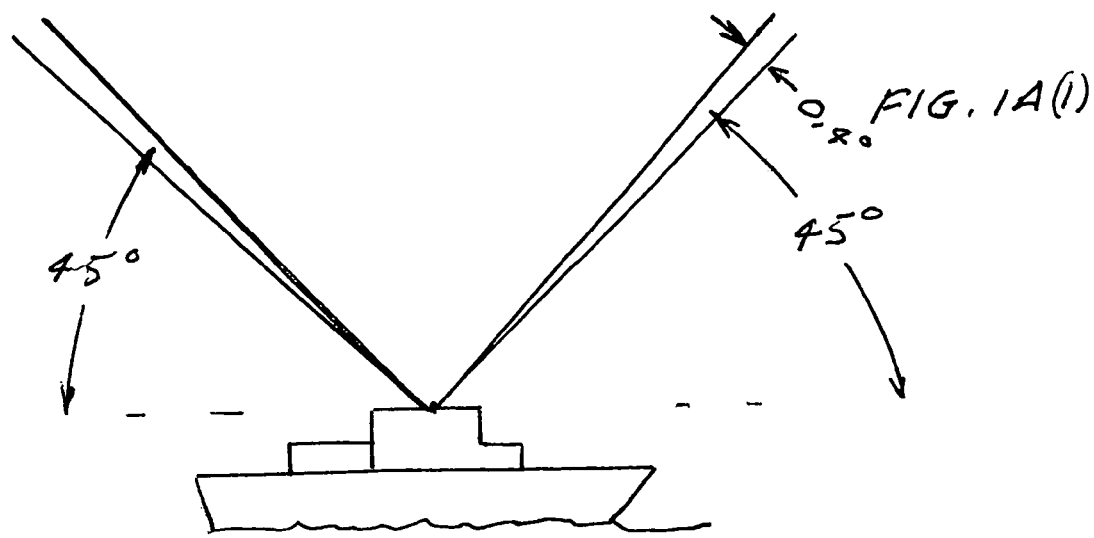
FIG. 1A(1)
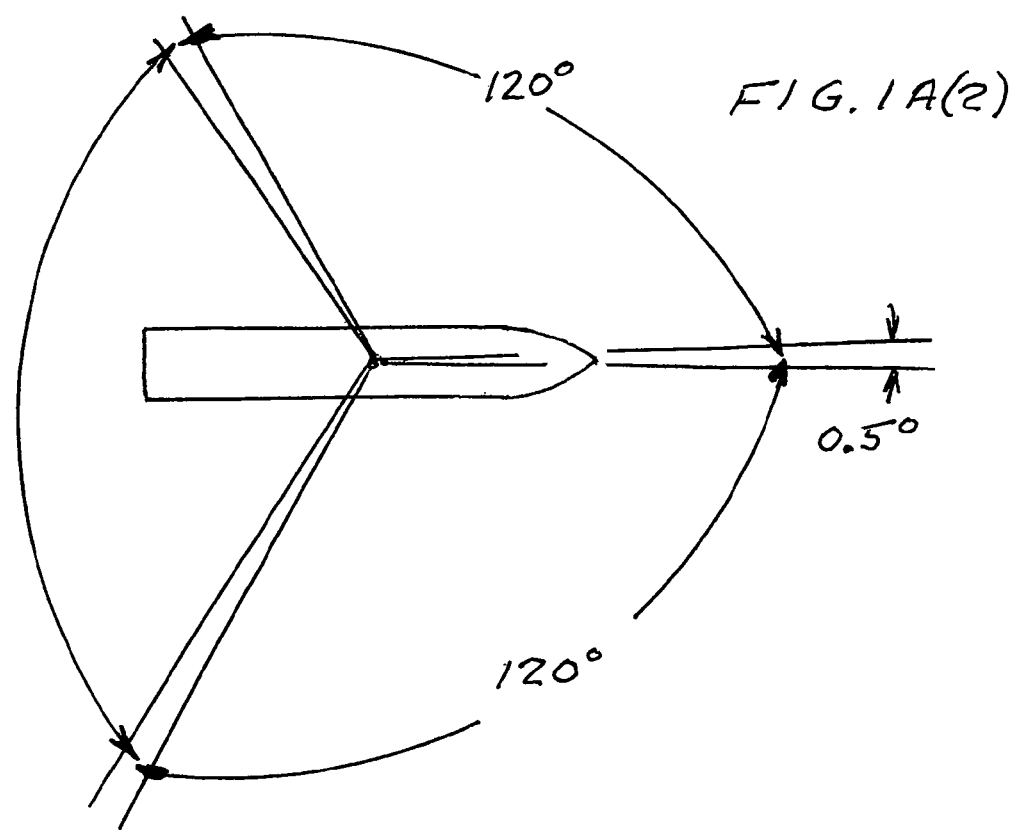
FIG. 1A(2)

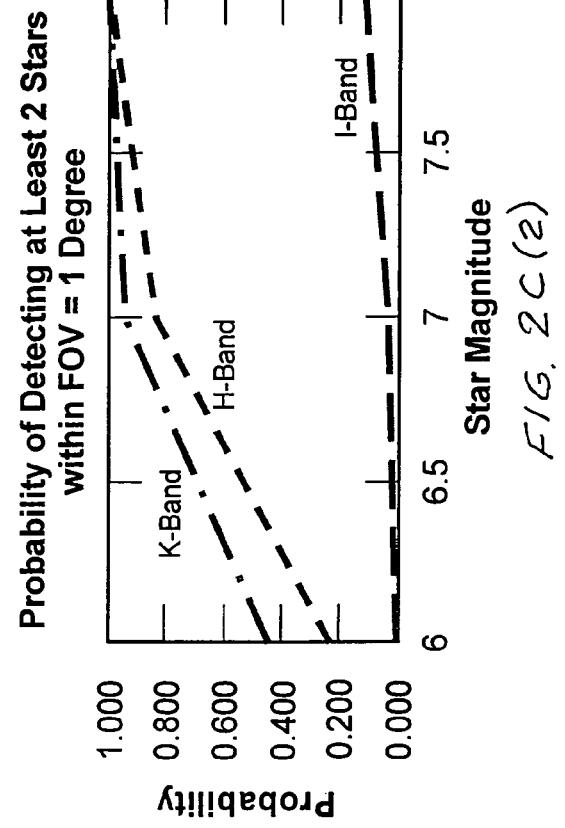
FIG. 2C(1)
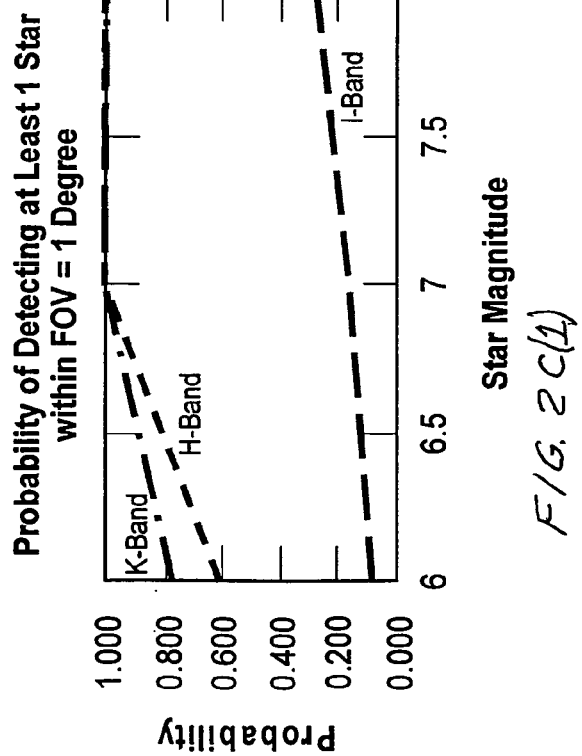
FIG. 2C(2)
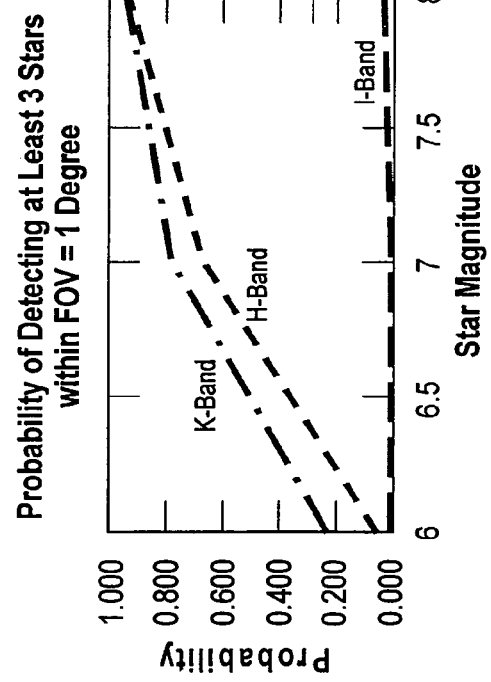
FIG. 2C(3)

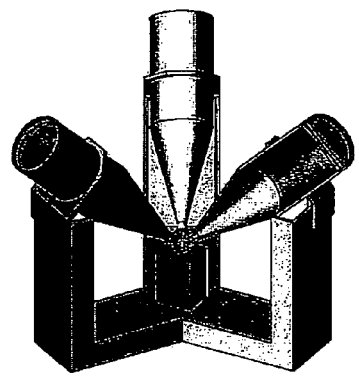
FIG. 5A
FIG. 5B
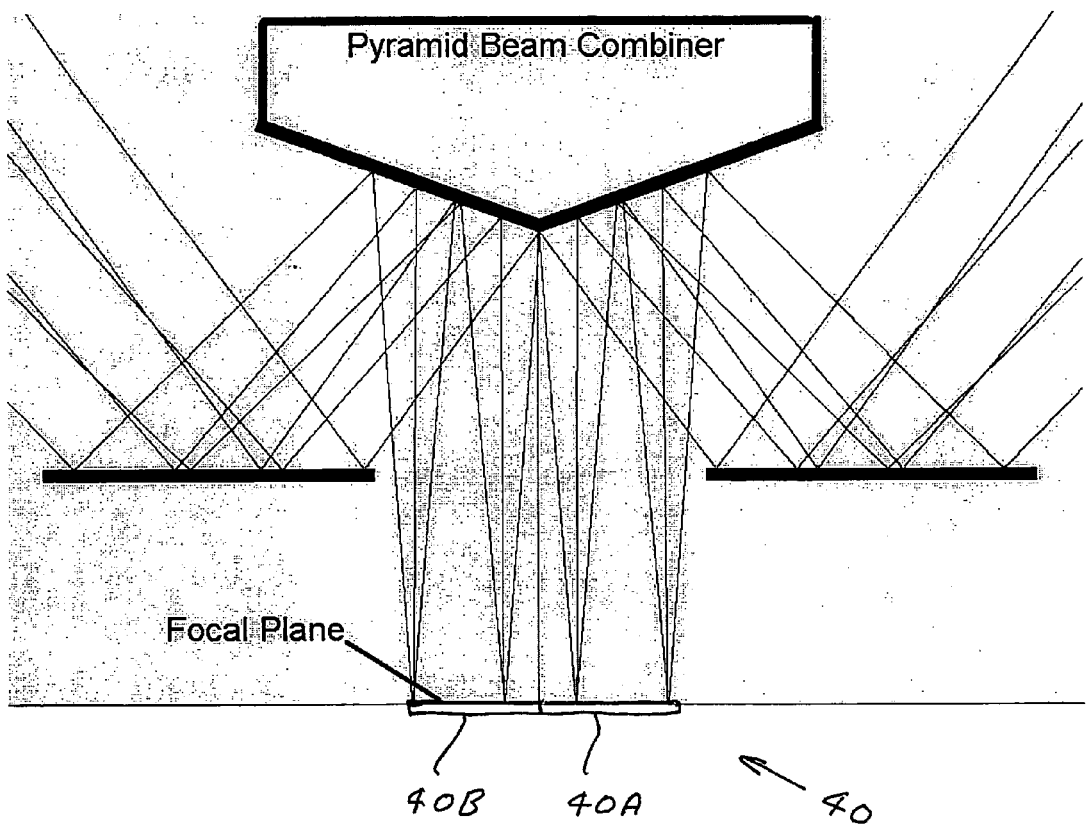

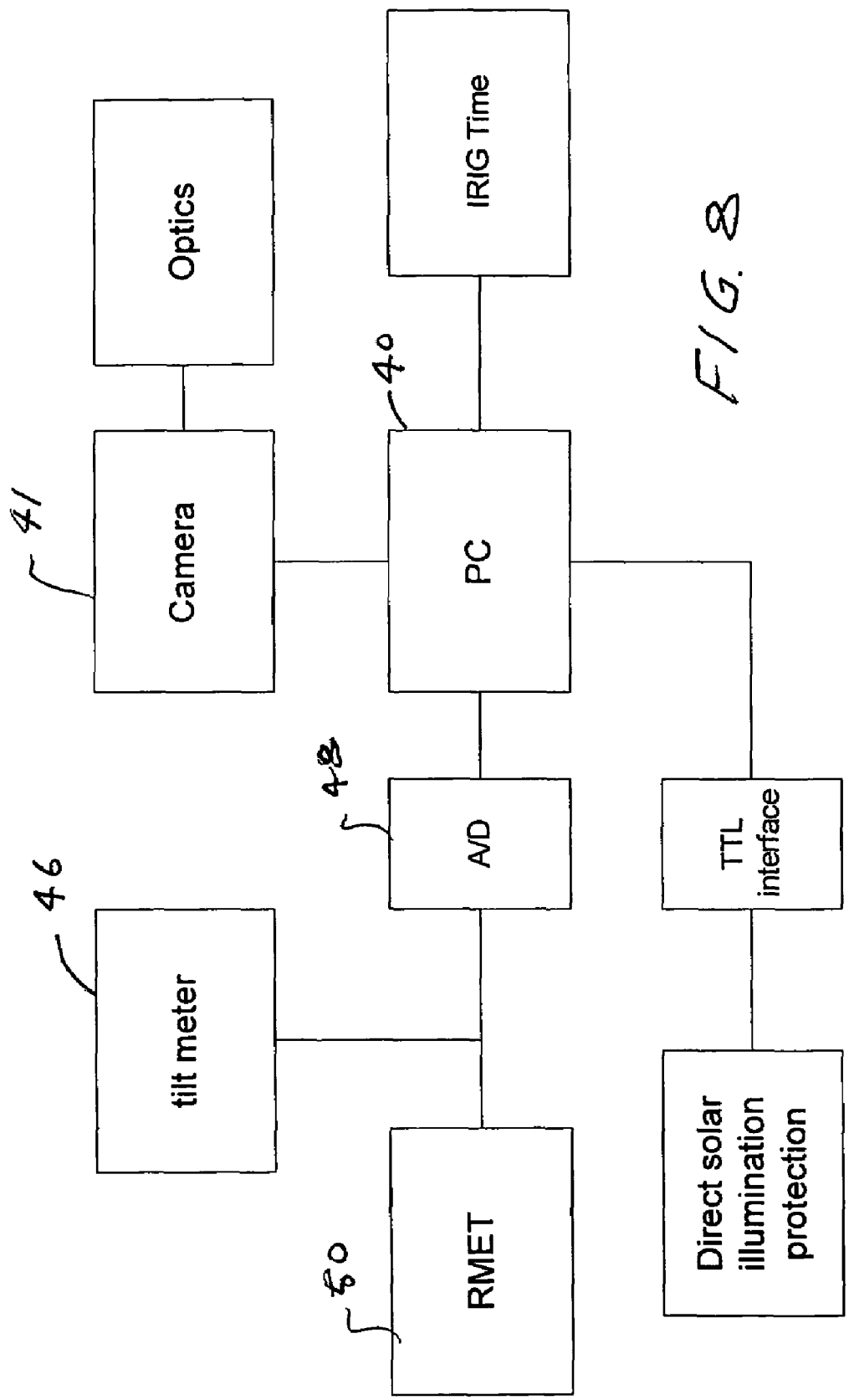

DAYTIME STELLAR IMAGER

This application claims the benefit of Provisional Application Ser. No. 60/619,858, filed Oct. 18, 2004.

FIELD OF INVENTION

This invention relates to stellar imaging systems and in particular to such systems useful for position location and platform attitude determination.

BACKGROUND OF THE INVENTION

Global positioning systems (GPS) are widely used for navigating ships and aircraft. However, these systems are vulnerable and have other shortcomings. Their space components are subject to hostile attack and the systems may be jammed. The systems also suffer from reliability failures and these GPS systems do not provide absolute azimuth positioning needed for attitude determination. Inertial navigation systems (INS) mitigate GPS deficiencies; however, these inertial navigation systems are not accurate over long time periods. Errors may accumulate at rates of about an arc-sec per hour to an arc-min per hour. Periodic alignment of the inertial navigation systems is required using an external reference system such as a GPS system.

For centuries navigators have used the sky for the most fundamental and accurate inertial system available, in which each star is a benchmark. Cataloged positions and motions of the stars define the celestial reference frame. The problem is stars are hard to see during the daytime. Efforts have been made to navigate by stars during daytime using very sensitive visible light charge couple device (CCD) cameras, but these efforts as far as we know, have been unsuccessful due to the very limited number of stars that can be seen with this sensor.

A need exists for a backup to GPS systems and an absolute azimuth reference for fast alignment of INS systems.

SUMMARY OF THE INVENTION

The present invention provides an automatic celestial navigation system for navigating both night and day by observation of K-band or H-band infrared light from multiple stars. A preferred embodiment uses three telescopes with each of the three telescopes rigidly mounted with respect to each other and rigidly mounted on a movable platform such as a ship or airplane with each telescope being directed at a substantially different portion of sky. Telescope optics focuses, on to the pixel array of a sensor, H-band or K-band light from stars in the field of view of each telescope. The system also includes an inclinometer, an accurate timing device and a computer processor having access to cataloged infrared star charts. The processor is programmed with special algorithms to use image data from the infrared sensors, inclination information from the inclinometer, time information from the timing device and the cataloged star charts information to determine positions of the platform. No more than one of the three telescopes is ever pointed too close to the sun to detect stars. Direction information from two stars is needed for locating the platform with respect to the celestial sphere. The computer is also preferably programmed to use this celestial position information to calculate latitude and longitude which may be displayed on a display device such as a monitor.

In a preferred embodiment each of the three telescopes on a moving ship views a 0.5×0.4 degree region of the sky for H-band starlight. Located stars, usually those with brightness greater than 6.4 H-band magnitude, are then compared with star positions from the star catalog within a selected 5×5 degree region of the sky. A correlation of the data from the three telescopic measurements determines the position of the ship to a precision of 30 meters. The computer uses this position and the ship's speed, direction and attitude (pitch and roll) to establish the 5×5 degree region for the next correlation. Applicants have determined that there are an average of about 300 to 400 daytime visible infrared stars in these 5×5 degree regions of the Milky Way portion of the sky and an average of about 30 to 40 visible infrared stars in the 5×5 degree regions in other portions of the sky.

Preferred embodiments have no moving parts, automatic star detection and star pattern recognition algorithms. These embodiments are jam proof and insensitive to radio frequency interference. These systems provide efficient alternatives to GPS when GPS is unavailable and can be used for periodic augmentation of inertial navigation systems. These systems also provide absolute azimuth measurements for platform attitude determination.

The invention is based upon Applicants' discovery that, at infrared wavelengths, a large number of stars (at positions offset by more than about 30 degrees from the sun) "outshine" the sky background even at mid-day. Preferred embodiments of the invention utilize three infrared telescopes imaging simultaneously three small areas of the sky, about 45 degrees in elevation with each telescope separated from the others by 120 degrees in azimuth. System software detects and identifies stars and calculates three crossing lines of position and a latitude/longitude celestial fix. Ship or aircraft positions may be up-dated every 5 to 10 minutes with position errors of less than 30 meters. Preferred embodiments of the present invention operate autonomously during daytime and nighttime, utilizes observations of stars, and in combination with an inertial navigation system, provide a secondary means, independent of radios and GPS, for navigation of aircrafts and ships.

Preferred processor software includes a background subtraction and a special signal to noise enhancement algorithm, star pattern recognition software, software for mapping of star direction, and an algorithm for computation of the lines of positions, celestial fix and latitude and longitude. Preferred software also includes instrument-control code.

The combination of the present invention with an inertial navigation system is a synergistic match. The accuracy of the inertial navigation system degrades with time from initial alignment, while the celestial fix accuracy is not time dependent. The inertial navigation systems are oblivious to bad weather, whereas celestial is sensitive to cloud conditions. Both the inertial navigation systems and systems of the present invention are passive, jam-proof, and do not depend on shore or space components. If a run of bad weather interfere with star sights, the inertial navigation system serves as a bad-weather "flywheel" that essentially carries the stellar fix forward until new observations can be obtained. Thus, a combination of the inertial navigation system and the present invention will provide an independent alternative to radios and GPS.

Systems designed by Applicants include very efficient optical sensors, which increases the probability of detecting stars during daytime by several orders of magnitude, as compared with a prior art approach based on CCD cameras operating at visible wavelengths. The latter is due to several factors including:

a) The number of infrared sources exceeds the number of stars in the visible waveband,
b) The daytime sky background is by a factor of 6-18 lower in the infrared wavebands than in the visible waveband, and
c) The full well capacity of selected infrared sensors is more than one order of magnitude higher than that for comparable visible sensors.

Additional advantages of this design approach are associated with the fact that atmospheric obscurants including haze and smoke affect infrared sensors less than sensors operating in the visible waveband, and the effect of daytime turbulence on the infrared sensor is lower.

BRIEF DESCRIPTION OF THE DRAWINGS

FIGS. 1A(1) and 1A(2) show a first preferred embodiment of the present invention.

FIGS. 2C(1), 2C(2) and 2C(3) show probabilities of detecting stars.

FIGS. 5A and 5B show a second three-telescope telescope design.

FIG. 8 is a block diagram showing elements of a preferred embodiment of the present invention.

DETAILED DESCRIPTION OF PREFERRED EMBODIMENTS

First Preferred Embodiment

A first preferred embodiment of the present invention is shown in FIGS. 1A(1) and 1A(2). This is a stellar imaging system useful for day and night accurate stellar navigation for ships. The system is a "strap down" system (i.e., it is mounted or "strapped down" on a platform, in this case a ship) with no moving parts. Three telescopes, separated by 120 degrees in azimuth and directed at 45 degrees in elevation, provide images of stars on three infrared 256×320 pixel cameras designed for operation in the infrared waveband at about 1.6 micron wavelength. The instantaneous field of view of each camera is 0.4×0.5 degrees, which provides a very high probability of imaging stars that are recognized by a computer system programmed with special algorithms, a star catalog, and star pattern recognition software. The camera is a fast frame rate camera operating at frame rates up to 30 Hz with a full well capacity of 5 million electrons, with thermoelectric cooling.

Figure 1B:
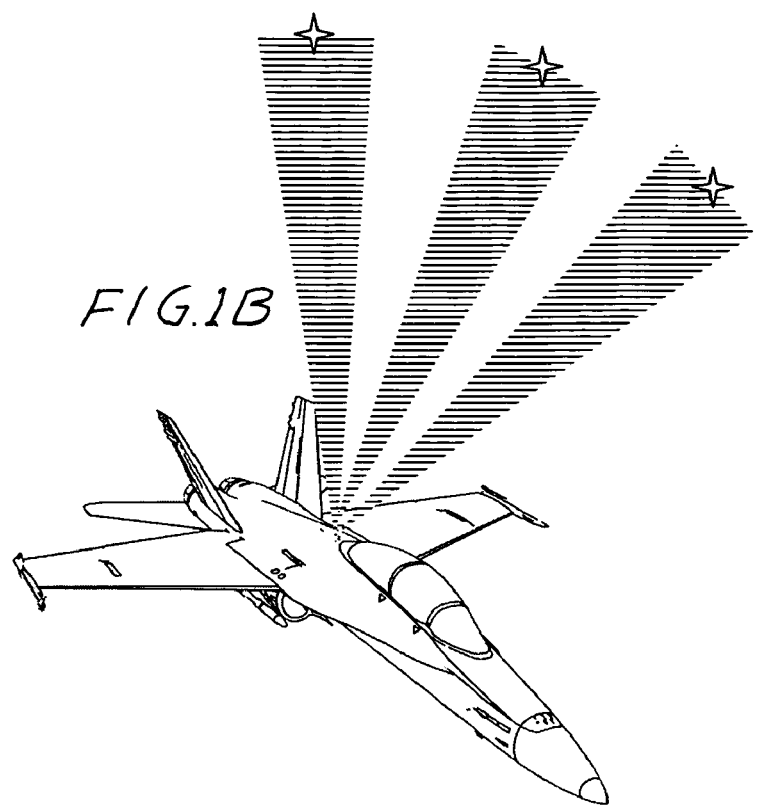
FIG. 1B shows a second preferred embodiment of the present invention.
Figure 1C:
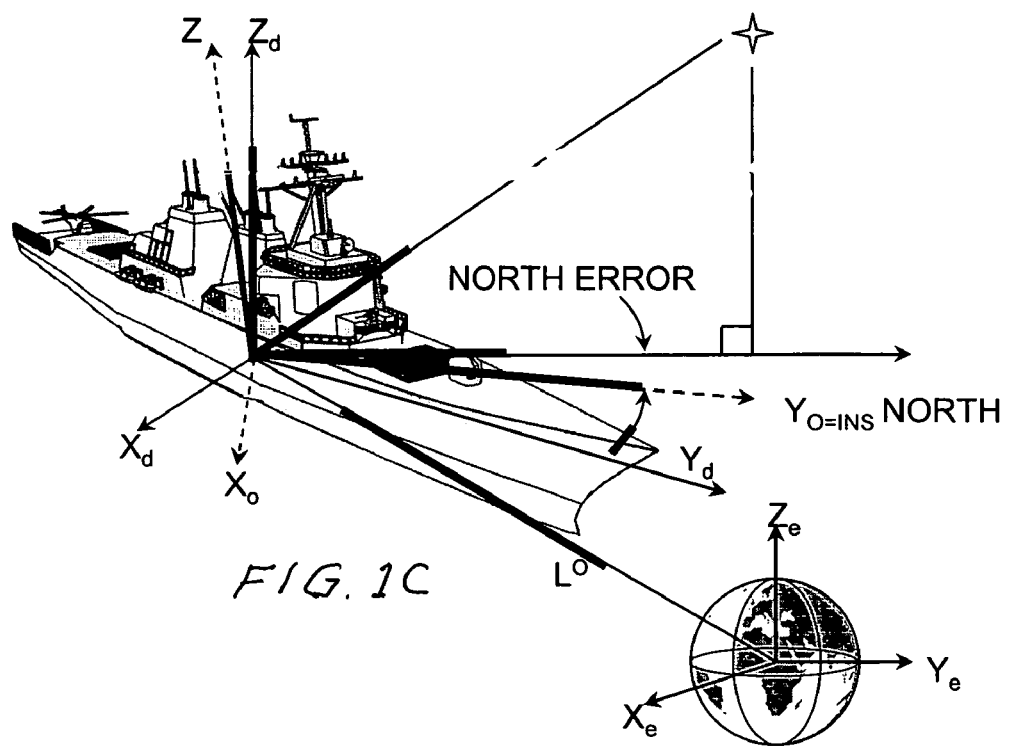
FIG. 1C shows a third preferred embodiment of the present invention.

A second preferred embodiment is shown in FIG. 1B. This embodiment is similar to the ship version but is designed for aircraft day and night navigation. In this embodiment a fewer pixel camera is used providing shorter exposure times to prevent blurring due to faster aircraft motion The third preferred embodiment is shown in FIG. 1C. This embodiment uses a single telescope to provide accurate azimuth reference for at-sea inertial navigation system calibration for attitude determination.

Many more details on the features of these two embodiments are provided in the section below that discusses Applicant's research and these specific features and design choices made by Applicants.

Applicants Spectral Investigations and Selection

Almost all celestial navigation at sea level using starlight has in the past been at night with observations at visible wavelengths. During the day, sunlight scattered in the earth's atmosphere produces background illumination that makes detection of starlight difficult. Also, strong daytime sky background quickly fills small electron collection "wells" of visible sensors, thus limiting the aperture diameter and/or exposure time. As a consequence, visible sensors have small signal to noise ratios and poorer overall sensor performance.

Figure 2A:
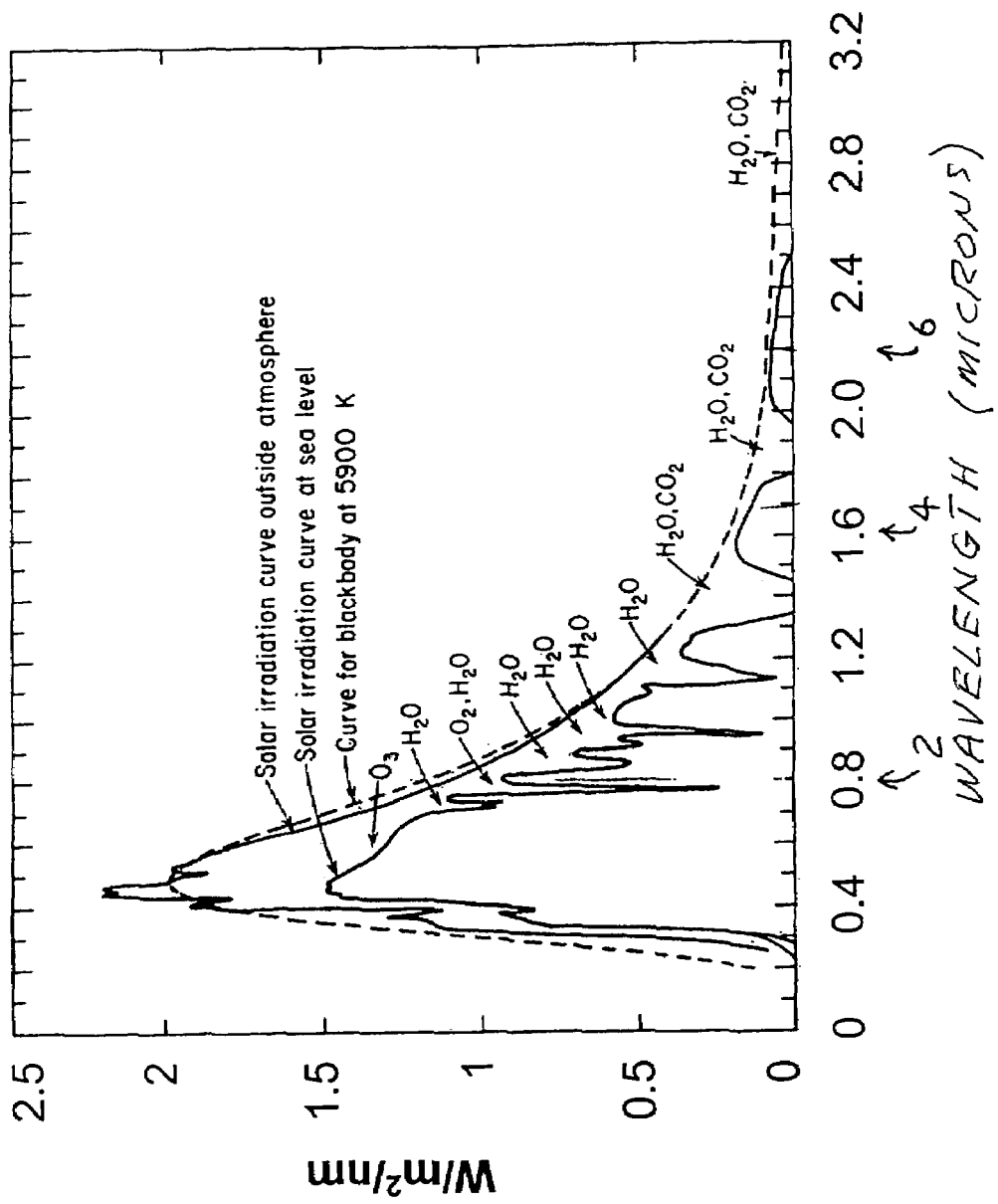
FIG. 2A is a graph showing transmission through the atmosphere of light over a range of wavelengths.

Atmospheric transmittance at wavelengths between about 0.2 microns to about 3.2 microns is shown in FIG. 2A. Applicants have evaluated and compared the performance of three candidate sensor systems: one operating in the red portion of the visible spectrum (I-band, 0.8 micron wavelength, indicated at 2 in FIG. 2A) and two near-infrared spectral bands (H-band, 1.6 microns wavelength, indicated at 4 in FIG. 2A and K-band 2.2 microns wavelength, indicated at 6 in FIG. 2A).

The analysis included several analytic studies:
1) Examination of star statistics,
2) Evaluation of the atmospheric transmittance and daytime sky background in three spectral wavebands;
3) Evaluation of the effects of atmospheric turbulence, and atmospheric obscurants on three candidate sensor systems;
4) Development of a novel star detection algorithm,
5) Testing of the developed algorithm using simulated and field data;
6) Evaluation of commercially available electronic and optical components and
7) A trade-off study.

Applicants characterized the overall sensor performance by the probability of detection of a given number of stars within the field-of-view of each telescope. They found that the probability of detecting stars at daytime with infrared sensors is much higher than that with a visible sensor. They determined, therefore, the infrared sensors operating at 1.6 microns or 2.2 microns are the best candidate systems for the hardware prototype.

Star Statistics

Applicants evaluated the star statistics in the visible I-band by using the Catalog of Positions for Infrared Stellar Sources and in the H-band and K-band by using the 2-Micron All Sky Survey catalog. Both of these catalogs are well known and are available on the Internet. They found that the number of stars in the infrared wavebands at similar intensity levels is an order of magnitude greater than the number of stars in the visible waveband. As an example, FIGS. 2C(1), (2) and (3) show the probability of detecting at least 1, 2 or 3 stars within a field of view of 1 degree versus star magnitude in the three spectral wavebands. For all star magnitudes the probability of detecting stars in the infrared wavebands is about an order of magnitude higher than in the visible waveband. This defines the first principal advantage of the infrared sensor.

Atmospheric Transmission and Sky Background

Figure 3:
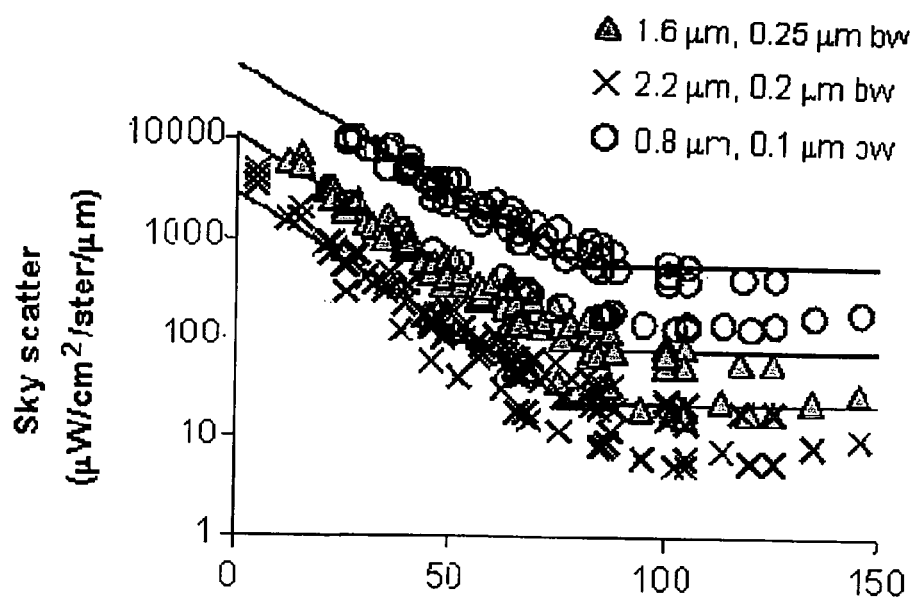
FIG. 3 shows sky scatter at three wavelength ranges.

Using a MODTRAN3 computer model available from M. E. Thomas & L. D. Duncan, which is described in "Atmospheric Transmission", in *Atmospheric Propagation of Radiation*, F. G. Smith, ed, Vol-2 of *The Infrared and Electro-Optical Systems Handbook*, J. S. Accetta & D. L. Shumaker, eds, ERIM, Ann Arbor, Mich., and SPIE Press, Bellingham, Wash. (1993), and MODTRAN & FASCOD references cited therein, Applicants evaluated the atmospheric transmission and daylight sky background in three candidate spectral wavebands (1.6 micron-0.25 micron bandwidth, 2.2 micron-0.2 micron bandwidth and 0.8 micron-0.1 micron bandwidth). The total atmospheric transmission in the infrared wavebands is 20 to 30 percent higher than the visible. Sky background radiation based on Applicants' calculations is shown in FIG. 3. The sky background radiation at potential wavelength ranges is plotted versus angular distance between the sun and the detector pointing direction for two atmospheric conditions (23 kilometers visibility and 10 kilometers visibility). They found that the daylight sky radiance in the infrared wavebands is significantly lower than that in the visible waveband. The sky radiance in the H-band and K-band is lower by a factor of 6 and 18, respectively, than that in the I-band. In addition, the average atmospheric transmittance in the infrared wavebands is higher and effects of atmospheric obscurants including haze, smoke, and clouds that can attenuate starlight is also lower in the infrared waveband than that in the visible. Thus, in the IR waveband there is less atmospheric scattering and higher transmission. This provides the second principal advantage of the infrared sensor. Total sea-level transmission through the atmosphere as a function of wavelength is shown in FIG. 2A.

Daytime Sea Level Turbulence

The effect of daytime sea-level turbulence on the infrared sensor is lower than that in the visible waveband. In particular, turbulence-induced scintillation at daytime can cause strong signal fades at the detector and thus degrade the performance of the visible sensor. The scintillation index, or normalized log amplitude variance, that characterizes the effect of turbulence on the star image brightness is reduced by a factor of 2.2 and 3.2 in H-band and K-band, as compared to I-band. Consequently, the effect of scintillation on an infrared sensor is expected to be small. Also the atmospheric coherence diameter, or Fried parameter, that characterizes turbulence-induced image blur, is increased by a factor of 2.3 and 3.4 in H-band and K-band, as compared to I-band. This defines the third advantage of the infrared sensor.

Full Well Camera Capacity

The fourth principal advantage of the infrared sensors is associated with the fact that the infrared cameras typically have a large full well capacity. The full well capacity of the infrared sensors exceeds the value for the CCD visible sensors by more than one order of magnitude (5 to 20 million electrons in the infrared waveband vs 0.1 million electrons in the I-band). A large full well capacity is extremely important for daytime operations. It allows Applicants to increase the signal to noise ratio for the infrared sensors by increasing the aperture diameter (up to 20 cm) and/or integration time to successfully detect stars in the presence of a strong sky background. Conversely, the small full well capacity of the visible sensor limits the aperture diameter and the total exposure and thus limits the signal to noise ratio, star detection limit, and probability of detecting stars. Large full well capacity is the fourth advantage of the infrared sensor.

Camera Frame Rate

The infrared sensors have much higher full frame rate, than visible sensors. Due to large pixel count (4096×4096 pixels) required to image a large field of view, the frame readout period is 3.5 sec in the visible, while it is typically 30 msec in the infrared waveband. This allows Applicants to increase the signal to noise ratio by averaging multiple frames. The accuracy of the image centroid calculations is determined by the image spot diameter $D_{star}$ and the signal to noise ratio.

$$\sigma = \frac{3\pi}{16} \frac{D_{star}}{SNR}$$

The signal to noise ratio is given by $$SNR = \frac{N_S}{\sqrt{N_S + 4(n_B + n_D + n_e^2)}},$$

where $N_S$ is the total number of signal photoelectrons detected in a frame (assuming within an area of 4 pixels and that the spot size full width at half maximum is approximately 1 pixel), $n_B$ is the number of sky background photoelectrons detected per pixel, $n_D$ is the number of dark current electrons per pixel, and $n_e$ is the number of read noise electrons per pixel.

Averaging of multiple data frames by using a shift-and-add technique provided an additional way to increase the signal to noise ratio. The signal to noise increases proportionally to $\sqrt{N}$, where N is the number of averaged frames. An implementation of this technique with the infrared sensors is straightforward because the frame rate for the IR cameras is approximately 5 to 30 Hz, depending on the exposure time. This provides the fifth advantage of operating in the infrared spectrum.

H-Band and K-Band are the Spectral Ranges of Choice

The above performance analysis revealed that the infrared sensor, as compared to the visible sensors, have a much higher probability of detecting stars. In particular, in a clear atmosphere for optimal aperture diameter and optimal angular pixel size the star detection limit for the I-band sensor is magnitude 3.3, whereas for the H-band and K-band sensors it is 6.8 and 5.8, respectively. The optimum field of view of the I-band sensor is 7×7 degrees, whereas the optimum field of view of the H-band and K-band sensors is 0.86×0.86 degrees and 1.3×1.3 degrees. For given sensor parameters, Applicants found that the probability of detecting at least 1 star with a 4096×4096 pixel I-band sensor is 0.18, whereas the probability of detecting at least 2 stars is 0.03. Under the same conditions, using a 512×512 pixel H-band sensor, the probability of detecting at least 1 star is 0.86 and probability of detecting at least 2 stars is 0.62. The number of infrared sources (H-band or K-band) of magnitude 7 is about 350,000 in the entire sky, whereas the number of I-band stars of magnitude 3.3 in the sky is only about 300. Thus, the probability of detecting stars using infrared sensor is higher than using the sensor operating in the visible waveband. Therefore, in sense of performance and utility for the surface fleet and aircraft navigation, the infrared sensors have greater value than the visible sensors.

Figure 6:
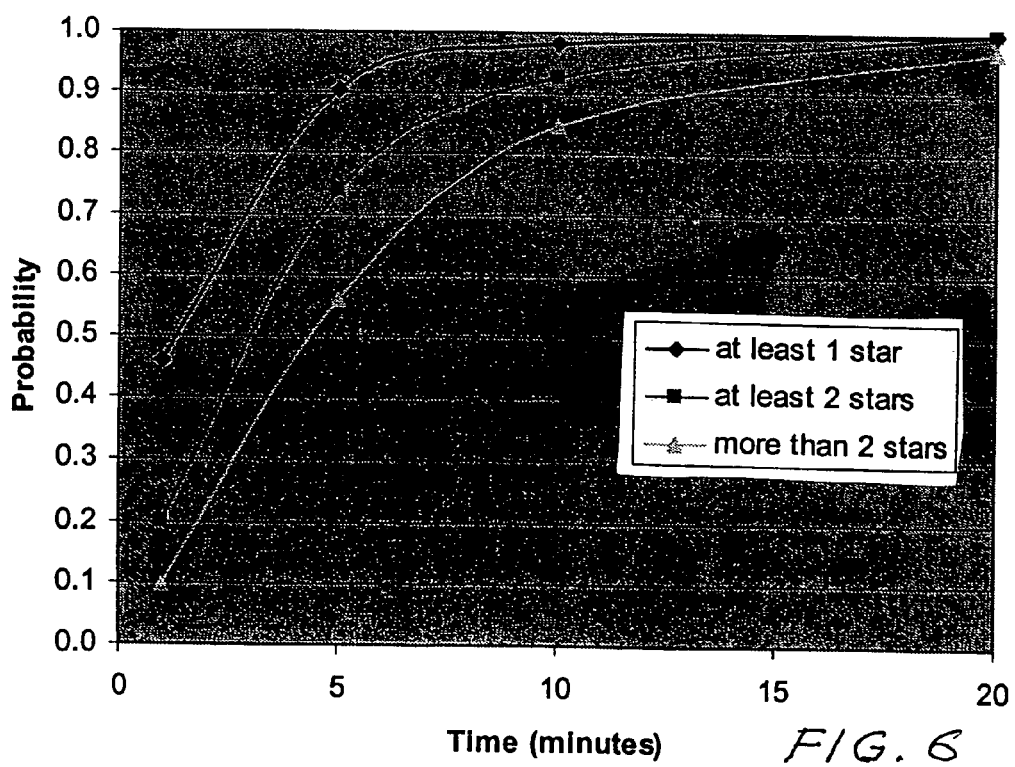
FIG. 6 shows probability of detecting stars as a function of search time.

Each of the three telescopes scan a region of the sky and the region grows with time. (The sky appears to rotate 1.25 degrees each five minutes.) FIG. 6 shows probability of detecting of at least 1, 2 and more stars in a 1×1 degree field of view with an infrared sensor that has star detection limit of 6.4 magnitude. The probability of detecting stars is shown versus observation time. The probability of detecting at least 1 star in the field of view exceeds 90% for the observation time of 5 minutes. For comparison, a strap-down system operating in the visible waveband and having field of view of 7×7 degrees and star detection limit of 3.3 magnitude will require 4-6 hours to detect at least one star.

In summary, Applicants' trade-off study revealed that the infrared sensor has an inherent advantage, based on the laws of physics, over the prior art visible sensor in probability of detecting stars.

Daylight Stellar Imager Sensor Optimization

Applicants' trade-off studies included a comparison of the H-band and K-band sensors in terms of detector format, cost, and cooling requirements. Applicants found that the H-band (InGaAs) sensor from Sensors Unlimited, which operates in the 0.9-1.7 micron spectral band, has sensor performance somewhat (but not much) better than to the K-band in terms of star detection probabilities, but this H-band sensor has several more important advantages over the K-band sensor. First, it is less expensive ($25K for a 320×256 InGaAs array from Sensors Unlimited versus $120K for a 256×256 HgCdTe sensor from Rockwell). Second, it requires only TE cooling to obtain low dark current levels for low noise performance and does not use liquid nitrogen. Third, its full well capacity of 5 million electrons is greater than the full well capacity of K-band sensors considered. For these reasons, the Sensors Unlimited Minicamera 320×256 pixels camera was selected for the hardware prototype of Applicants' first preferred system.

Applicants also determined the optimal number of fields of view to be simultaneously viewed, optimal sensor pixel size, and the field of view angular size. We found that the optimal pixel size in the H-band is approximately 6 arc-sec. Regarding the number of fields of view, Applicants considered two options:

a) using one field of view and taking sequential stellar measurements at different areas of the sky, or
b) using 3 fields of view and three cameras and doing simultaneous measurements.

Due to the effects of vibration and ship/aircraft motion on the line-of-sight between sequential stellar measurements, Applicants determined that simultaneous measurements with three fields of view are preferred for a hardware prototype. Each field of view is 0.4×0.5 degree.

Single Aperture Daylight Stellar Imager Opto-Mechanical Design

A single aperture telescope was constructed and star observations were performed at sea level at daytime. Images of known stars were taken and stored for post-processing to determine photon flux levels in the K-band or minimum detectable stellar magnitudes. Multiple data sets were collected for various atmospheric transmittance and angular distance from the sun.

Figure 10:
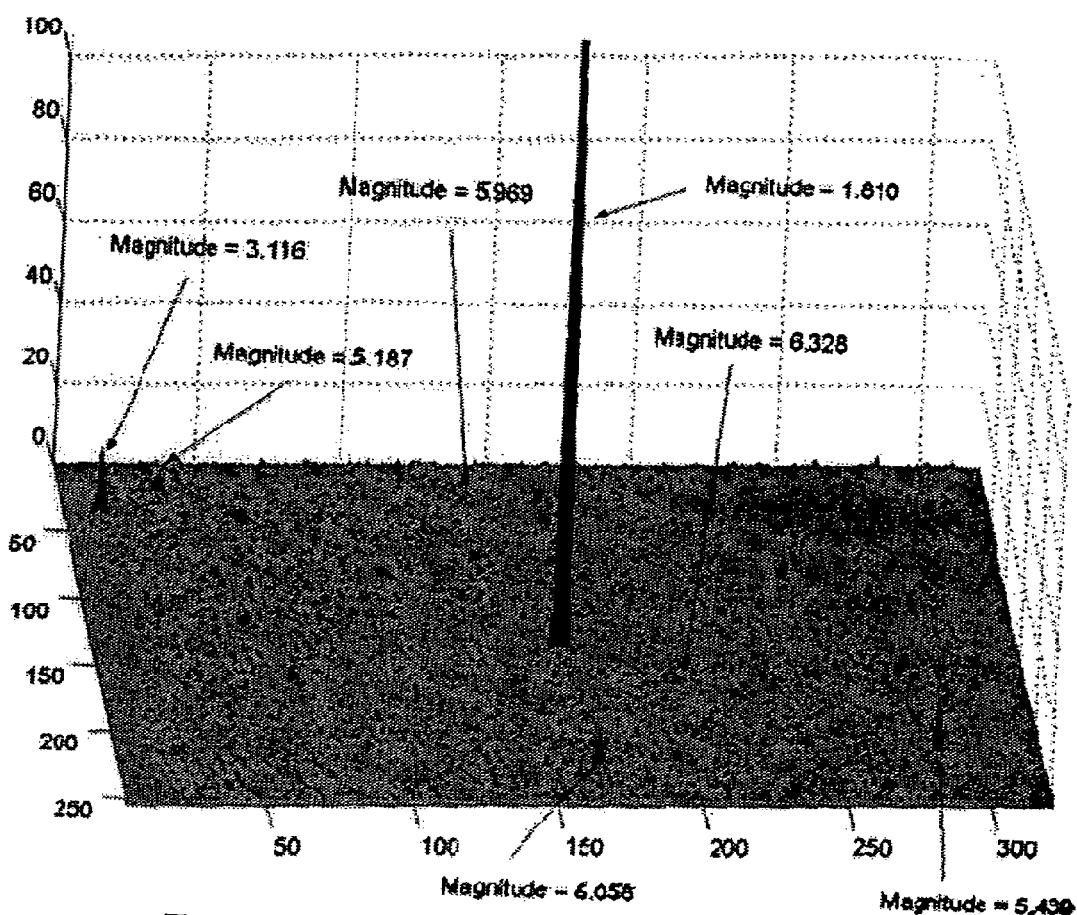
FIG. 10 is an example of starlight images.

FIG. 10 shows one example of the daytime K-band detection of stars with brightness values ranging from about 6.3 to 1.8 at an angular distance of 100 degrees from the sun. Seven stars are detected in the field of view of 0.4×0.5 degrees. These measurements confirm that minimum detectable stellar magnitude for the K-band sensor at daytime is about 6.4 to 6.9.

Multi-Aperture Daylight Stellar Imager Optical-Mechanical Design

Figure 4A:
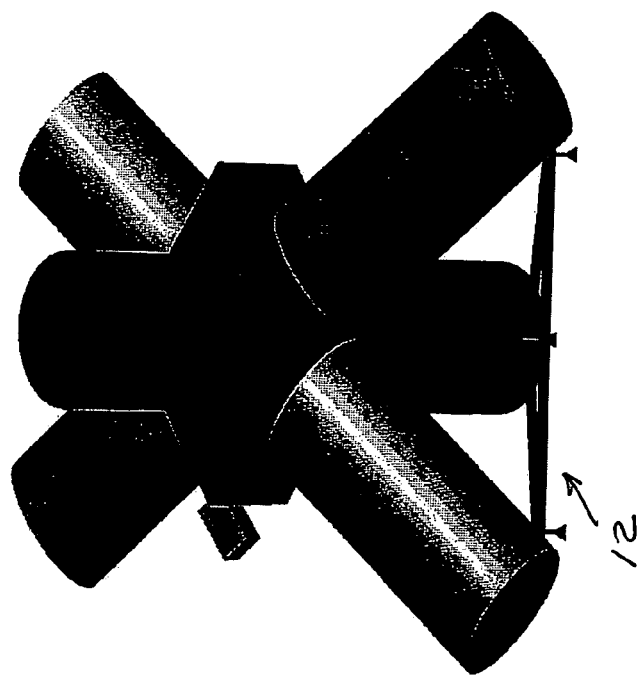
FIGS. 4A and 4B describe a telescope.
Figure 4B:
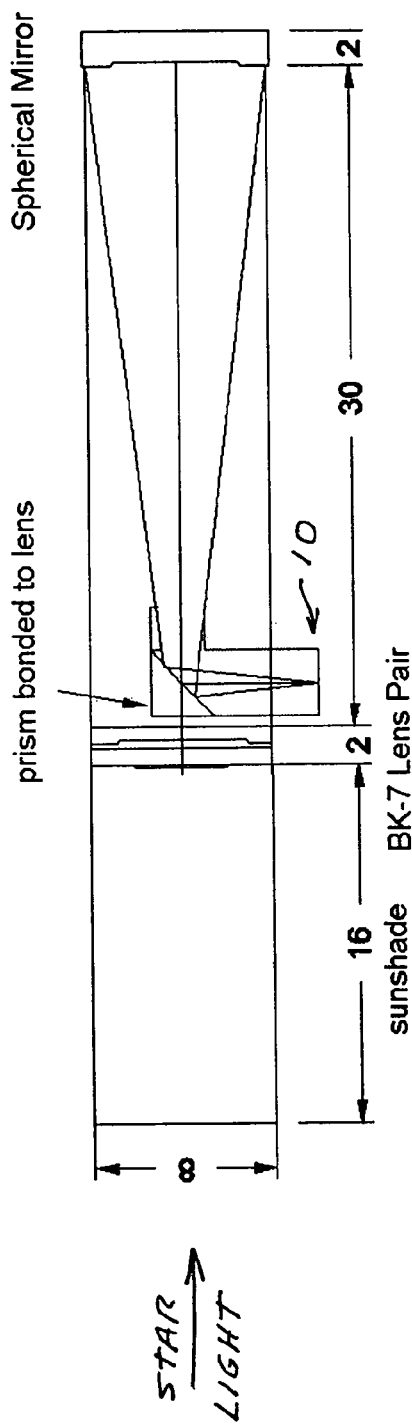

A first preferred embodiment is a device which can autonomously determine its geographical position with a horizontal position error of less than 30 meters both day and night purely from observations of stars and deliver a latitude/longitude fix every 5 minutes. This embodiment is shown in FIGS. 4A and 4B. It is a prototype designed as a multi-aperture, strap down system without moving parts. The multi-aperture optical-mechanical design is a direct extension of the single aperture design. The same 20 cm telescope system and three infrared cameras are used. Each of the three apertures are mounted to a Holtzen parallelpiped, providing a line-of-sight that is at the same zenith angle of 45 degrees (from the horizon) with a 120 degrees offset in azimuth between each of the three apertures. The use of three independent apertures allows for both increased positional accuracy due to the ability to triangulate the measurements and redundancy in case one of the apertures line of sight is close to the sun. The structural support of the optics can be a simple aluminum or fiberglass tube, but carbon fiber composites may be desired for better thermal performance. The tube extensions (beyond the first optical element) act as sun baffles. The performance of the system is maintained so long as direct sunlight does not scatter into the telescope. An even longer baffle would allow operation slightly closer to the sun, but the 30 degree baffle shown is adequate under most circumstances. FIG. 4B shows the optical components of one of the three telescopes. As shown in FIG. 4A the optical axes of three telescopes are intersected to minimize the system foot print and total dimensions. The cameras are fastened to the telescope structure normal to the optical axis as indicated at 10 in FIG. 4B. A triangular frame at the bottom as shown at 12 in FIG. 4A provides structure rigidity. The entire assembly is meant to have the same low expansion coefficient, so if the entire structure is shaded from direct sunlight and if the structure remains isothermal, then the angle between the telescopes should remain fixed. The total weight of this strap down assembly is about 120 to 140 pounds.

Platform Attitude Determination

Star measurements with a single telescope can provide absolute azimuth reference for platform attitude determination. Once a star in the field view is detected and identified, a corresponding line of sight is accurately known. A projection of this line of sight on the horizontal plane defined as cos(star azimuth angle) provides an absolute azimuth reference. A sensor system with three telescopes provides three independent azimuth references that can be averaged together to reduce the measurement noise.

Analysis and Algorithm Development

To further improve the sensor performance and reduce the star detection limit, Applicants developed a robust image processing algorithm. This algorithm allows Applicants to accurately determine star position in the imagery data recorded in the presence of a strong sky background and having low contrast and low signal to noise ratio. The basic concept is the following. The algorithm uses the fact that the pixels which include the star image are illuminated with spatially correlated light (photons all coming from the same source, a single star), whereas pixels that are illuminated with only sky background are illuminated with spatially uncorrelated light (randomly scattered photons from the sun). Therefore, if the signals in the neighboring pixels are summed up, pixels with the star image and the noisy pixels will have different gain, and thus can be distinguished. If $N_p$ pixels are summed up, then the signal level in the super-pixel with the star light will increase proportionally to, $N_p$, whereas the signal level in the super-pixel that include noise increases proportional to $\sqrt{N_p}$. Thus, the signal to noise ratio increases by a factor of $\sqrt{N_p}$. Similarly, when N image frames are summed up, the signal to noise ratio increases by a factor of $\sqrt{N}$.

The image processing algorithm includes two stages: a) background subtraction and noise reduction stage and b) star detection and centroid determination stage. For Applicants' prototype unit, each data frame is time stamped using a time reference instrument provided by Inter-Range Instrumentation Group (IRIG) and an off-the-shelf personal computer interface card. The IRIG system relies on GPS for time determination but has an AM radio backup in the case GPS is not available. The time is accurate to within 1 microsecond, which is very small compared to preferred timing requirement of 10 milliseconds (corresponding to 5 meters in platform position error). Since it is important for many applications that the system be independent of GPS, Applicants will replace the IRIG time base with an alternate clock source which is independent of GPS. Atomic clocks are standard equipment on many ships could provide the alternate clock with sufficient accuracy. These alternate timing sources can be reset with GPS or radio when the reset sources become available.

The image processing algorithm includes the following steps:

1. Median value subtraction. This step reduces the fixed pattern camera noise. Consider the data set that consists of 20 frames. First, using 20 data frames that precede the first frame in the data set, the median data is calculated to for each pixel. Then, the median frame of pixels is subtracted from each frame in the data set, pixel by pixel.
2. Next, to reduce noise, five sequential data frames in the data set are blindly summed up. This typically spreads star illumination over a few pixels.
3. Then a "super pixeled" image is created by down sampling the image generated in step 2 at the rate of 1:4 (i.e., four adjacent pixels are summed across the pixel array)
4. Determine the brightest super pixel in the first frame from step 1 and create a small (9×9 regular pixel size) window about the brightest super-pixel location (81 pixels with the brightest 4×4 in the middle).
5. To increase the centroid accuracy, up sample the image within the window at the rate 10:1 using cubic spline fit algorithm. (The computer produces a digital array of 90×90 [8100] virtual pixels and fits them with the cubic spline fit algorithm into a Gaussian-like shape.)
6. Calculate the intensity weighted centroid. Under this step an expected star location in the first data frame is determined.
7. Repeat steps 5-6 for each subsequent data frame in the data set.
8. Once an expected star location in all subsequent data frames are determined, shift all 20 frames to the star position in the first frame, and sum up all frames. This step produces the final image for star detection within the 9×9 pixels window. The extent of the shift is based on the location of the centroid.
9. Once an expected star location in all subsequent data frames are determined, shift all 20 frames to the star position in the first frame, and sum up all frames, The final image for the entire frame is based on the shifts obtained from the 9×9 pixel centroiding window. The extent of the shift is based on the location of the centroid.
10. Create a "super pixel" representation of the shifted and added frame obtained from step 8 by down sampling at the rate of 1:4 (i.e., four adjacent pixels are summed across the pixel array). Determine brightest super pixel and create a small (9×9 regular pixel size) window about that location.
11. Up sample the image within the small 9×9 pixel window with a ratio of 10:1 by using cubic spline fit algorithm. Remove background by chopping at noise ceiling, calculate intensity weighted centroid position as well as total intensity in the image. Make an estimation of the rms noise by taking the standard deviation σ of all pixels [other than pixels illuminated by bright stellar objects] in the entire image frame. Remove the data within the small window in order to search for the next dimmest star. Repeat steps 9 and 10 until all potential stellar objects within the frame are found.
12. For each potential star location, the pixel SNR is calculated:

$$SNR = \frac{I_S - \langle I \rangle}{\sigma},$$

where $I_S$ is the total signal intensity divided by number of pixels in the image, $\langle I \rangle$ is the mean intensity in the image, and σ is the rms noise. If the SNR≧10, then the star is detected. The star coordinates are determined by intensity weighted centroid calculated in step 11. If SNR<10, then this potential star location is rejected and treated as a noise.

13. The star coordinates alone with the star intensity calculated in step 11 are used further by automated star pattern recognition algorithm. Also the coordinates of the brightest star in the field of view are used in calculations of the latitude/longitude celestial fix and absolute azimuth determination.

The above algorithm was tested on both simulated data and field data. Applicants found that the algorithm allows us to detect 6.4 magnitude stars in the imagery data recorded at sea level at daytime. They also found that the measured distances between stars agree with their catalog values to the accuracy of 0.5 arc-seconds.

Star Catalog Development

Stellar identification and celestial latitude/longitude fix calculations require the infrared star catalog that includes accurate star positions, motions, and magnitudes (apparent brightness). Researchers from US Naval Observatory based on the 2MASS catalog and other sources available provided the IR star catalog that includes about 350,000 stars down to $7^{th}$ magnitude. The H band magnitude corresponds to the 1.6 μm waveband where the camera is sensitive. Only objects brighter than or equal to the $7^{th}$ magnitude were included in order to limit the disk space required to store the data.

Automated Star Pattern Recognition Algorithm

Using star positions and star relative brightness alone with the triangle patterns, the stars in each field-of-view are identified using reference catalog of positions and relative brightnesses, which is a subset of the infrared catalog. The reference star catalog currently covers the entire sky with 350,000 stars visible in the infrared. The field of view of each of the three telescopes is an area of the sky of 5×5 degrees centered about the pointing direction for each telescope determined based on the inclinometer measurements of the local horizon, and the angular separation of the three fields. When looking at the Milky Way the number of stars in the 5×5 field is about 300 to 400 and in regions of the sky other than the Milky Way the number of stars is about 30 to 40. In another embodiment the fields of view are increased to 10×10 degrees. All star catalog positions are corrected to the current epoch and corrected for proper motion. The distances between all star pairs in the reference catalog are calculated.

After that the measured distances between all star pairs detected in the field of view are calculated. The stars detected within the field of view are listed in descending order, where the brightest stars are listed first. The first star pair would represent the brightest two stars. Position of each star is corrected for atmospheric effects and stellar aberration. Then the distances between all star pairs are calculated. Next the measured distances between stars are compared with the distances from the reference catalog. In order to accommodate the centroid measurement errors and effects of turbulence of a star image, a 5 arc-seconds error is allowed.

In addition to the distances, each observed pair of stars also include a ratio of the relative intensities. The measurements performed by the Applicants revealed that individual star measurements fit the curve $$M_2 - M_1 = 0.4^* \log_{10}\left(\frac{I_1}{I_2}\right) \quad (1)$$

with an error of 0.5 star magnitude. Here $M_1$ and $M_2$ are the star magnitudes from infrared catalog, and $I_1$ and $I_2$ are the measured star intensities.

By using these two criteria, only the star pair, which matches the catalog distance within the accuracy of 5 arc-sec, and also their measured relative intensities match the ratio of the catalog intensities within the error of 0.5 star magnitude are accepted. If there are more than two stars in the field of view, then once the pair 1-2 is correctly identified, the search for each subsequent star's distance as related to star one and two, i.e. 1-3, 2-3, 1-4, 2-4, etc, is performed. The major change in the identification of these stars is the use of an additional conditional statement that includes a triangle pattern.

Figure 7A:
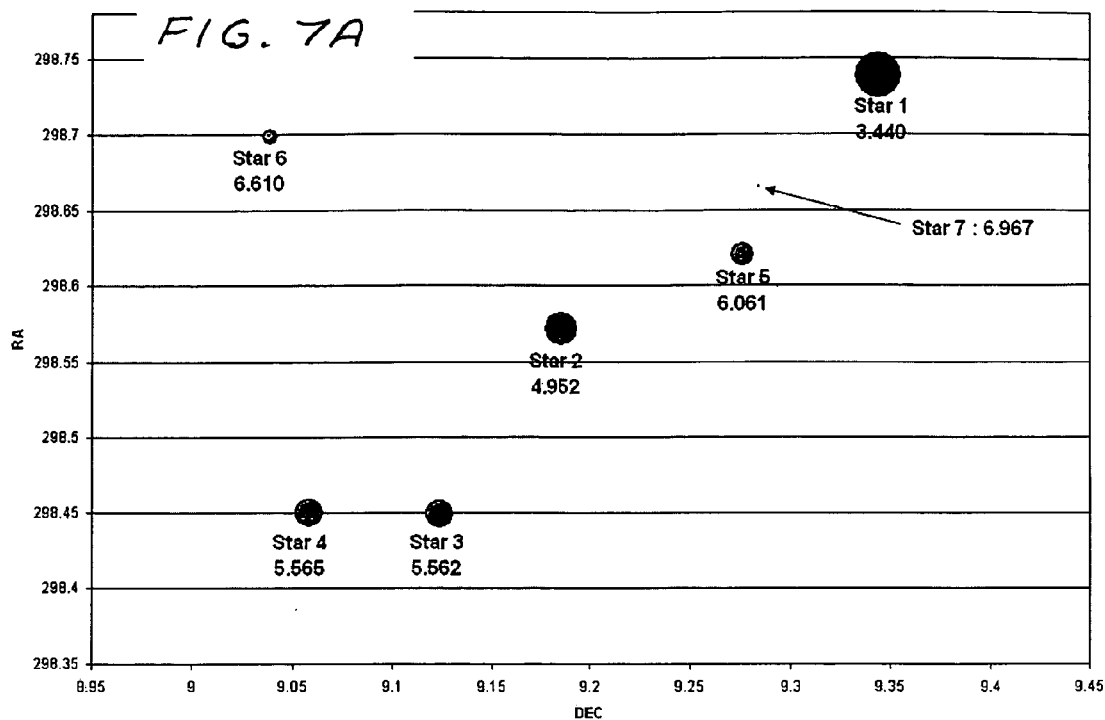
FIGS. 7A and 7B show correlation of star image data with a star chart.
Figure 7B:
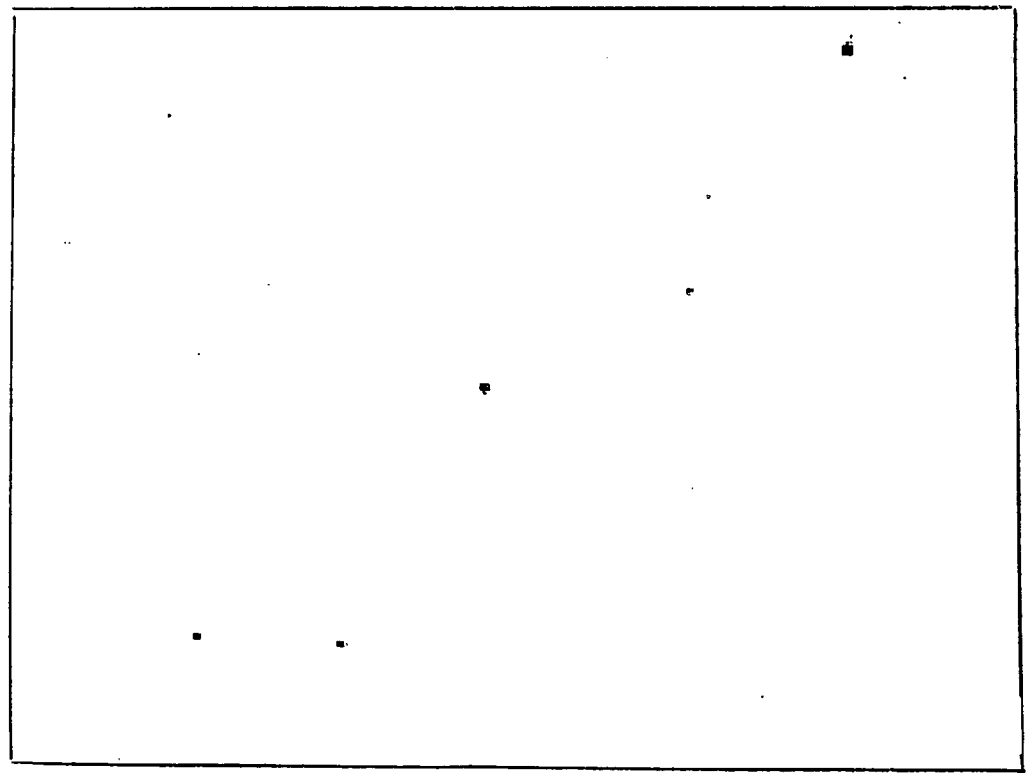

Each subsequent pair must include either star one or star two, otherwise this star is rejected. This creates a form of a triangle pattern, where stars one and two present two of the three points. The third point in each triangle is the next star in question. This algorithm was successfully tested on the field data recorded at both day and night. FIGS. 7A and 7B show one example of the stars identified from the field data recorded at daytime (FIG. 7B) and compared with the star map (FIG. 7A) from the infrared catalog. Six stars having brightnesses varying from 3.4 to 6.6 magnitude are detected and identified. The $7^{th}$ star in the field of view that has a brightness of $7^{th}$ magnitude was not easily detected. Finally, if a single star is detected in the field of view, then the algorithm will use the relative magnitudes and positions of stars in all three fields for star identification.

Sensor Software and Electronics

A simple block diagram of the electronics is shown in FIG. 8. All of the components are controlled by software written on a standard personal computer 40. The interface to the camera 41 is achieved using a frame grabber board (not shown) on the personnel computer interface bus with off-the-shelf software drivers provided by Sensors Unlimited. Each frame is time stamped. A commercial inclinometer 46, currently base lined as a unit from Jewel Instruments, will be used to provide the local horizon measurement necessary to determine the elevation angle of the detected stars. The inclinometer provides a pair of analog voltages proportional to the tilt in each of two axes. The tilt meter output is digitized by an off the shelf analog to digital converter 48 synchronized to the camera frame acquisition. The analog to digital converter is also used to digitize the output of an off-the-shelf Meteorological Station system. The temperature and pressure are preferably used to correct the stellar position measurements for atmospheric refraction. For elevation angles (greater than 10 degrees), the atmospheric refraction is a function only of the local index of refraction which can be predicted accurately knowing only the wavelength of light, and the temperature and pressure.

Figure 9:
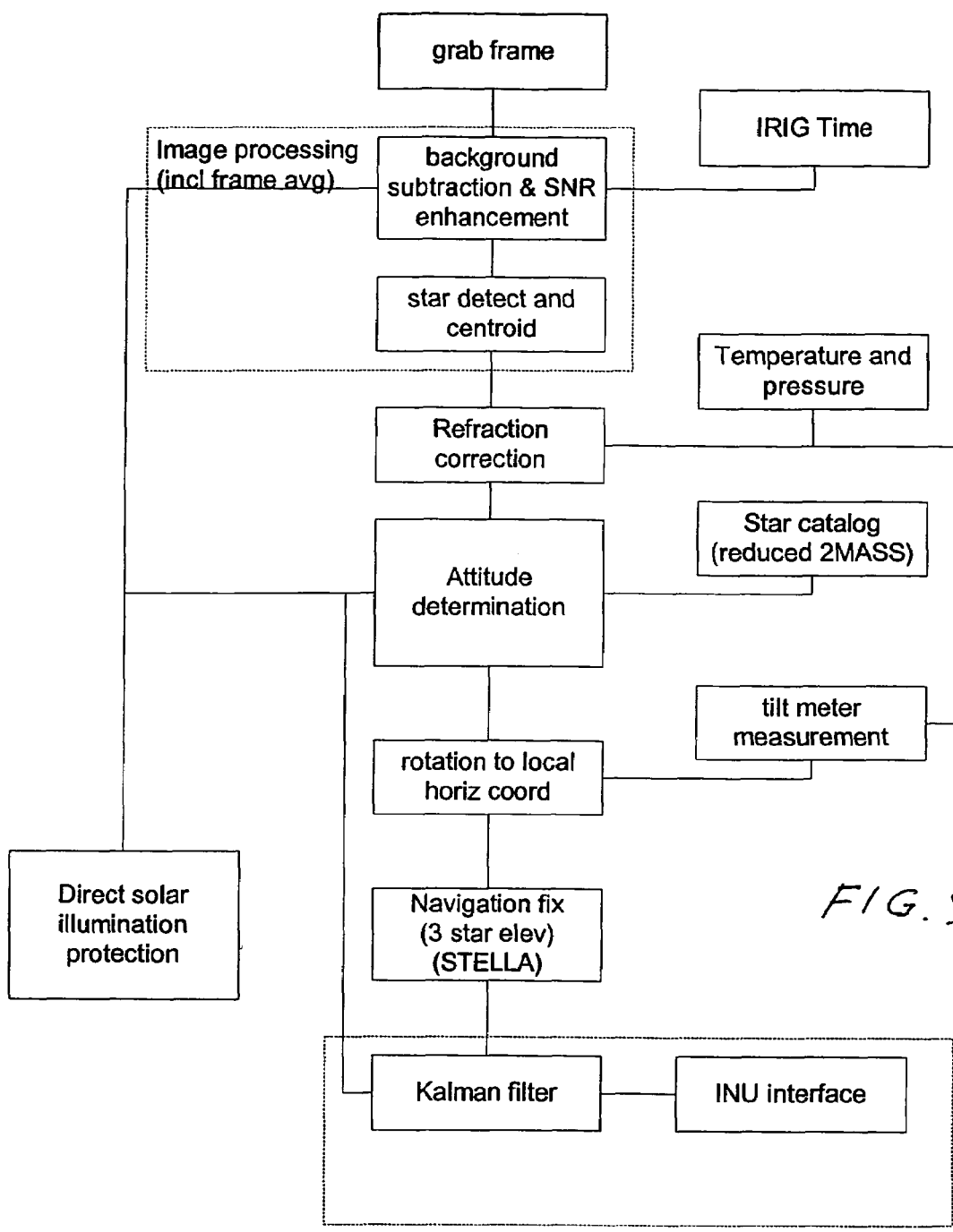
FIG. 9 describes elements of a preferred algorithm for navigating by starlight.

All software runs on standard personal computer 40. As a baseline the software is written in C++. A flow chart of the software to operate the camera, to process the frames, and to determine the longitude/latitude celestial fix is shown in FIG. 9. A single exposure from the camera is transferred from the frame grabber board to the personal computer using software drivers, and is time stamped from the RIG time base. Using the image processing algorithm described above, the stars in each field of view are detected. The stellar positions within each field are then corrected for atmospheric refraction. Then using the stellar positions and relative brightness along with the triangular patterns the stars are identified.

After that longitude and latitude celestial fix is determined using the measured stars elevations from at least two of the three fields. Applicants use all three when they are available. When several stars are detected within the field of view, the elevation of the brightest star is used in position fix calculations. The fix calculations are performed using the engine from the STELLA software developed at the US Naval Observatory. (J. A. Bangert, "Set Your Sights on STELLA: New Celestial Navigation Software from US Naval Observatory, Chips, Vol. 14, No. 5, pp 5-7 (1996). This software calculates both celestial positions and latitude and longitude for the platform, as well as the platform speed and direction.

The Use of the Stellar Measurements

The obtained celestial position fix provides a back up for GPS, when the GPS is not available. In addition, it will provide periodic alignments for the inertial navigation system to correct for the drifts and latitude bias. In preferred applications the present invention is integrated with the inertial navigation system. This helps to mitigate an impact of a cloud cover on the performance of the present invention. If bad weather separates star sights, the inertial navigation system will carry the stellar fix forward until new observations can be obtained. Finally, each star measurement provides an absolute azimuth needed for platform attitude determination.

Kalman Filter

Kalman filtering is a preferred method for estimating, or updating the previous estimate of a system's state by: (1) using indirect measurements of the state variables, and (2) using the covariance information of both the state variables and the indirect measurements. The basic idea is to use information about how measurements of a particular aspect of a system are correlated to the actual state of the system. The Kalman filter estimates a process by using feedback control: the filter estimates the process state at some time and then obtains feedback in the form of (noisy) measurements. Accordingly, the equations for the Kalman filter fall into two groups: time update equations and measurement update equations. The time update equations are responsible for projecting forward (in time) the current state and error covariance estimates to obtain the a priori estimates for the next time step. The measurement update equations are responsible for the feedback, i.e., for incorporating a new measurement into the a priori estimate to obtain an improved a posteriori estimate.

Kalman filtering is an important tool in many navigation systems. Indeed, the Kalman filter can be used to integrate the present invention with an inertial navigation system (INS). The INS is considered to be the system model and its outputs are regarded as the referenced trajectory. Measurement aids, including data from the present invention, are used to compute errors and they are applied to the reference to generate the combined output. The filter can accept as data the estimates and covariance matrices for vessel coordinates and source positions generated from the analysis of the primary observations. Similarly, it can be used as an observer in a feedback system for disturbance rejection (and hence smoothing a vessel's motion) using estimates of the vessel coordinates, since tracking and output disturbance attenuation are essentially equivalent problems (at least for linear models).

Alternatives, Modifications and Variations

Alternate Telescope Designs

An alternative design approach for the multi-aperture unit uses a single infrared camera with large pixel count and is required to combine the light from each of the three independent apertures on a single detector array. The preferred technique uses a small turning mirror and 3-sided pyramid mirror to combine the light from the different apertures. FIGS. 5A and 5B show the design of a pyramid mirror combining system for combining three celestial beams onto a single infrared sensor 40 located at the focal plane of each telescope. The light from each lens assembly is first reflected off a small turning mirror and then a three-sided pyramid shaped mirror placed directly in front of the camera array. These pyramid assemblies are typically polished from a solid glass substrate and are generally used in the opposite direction as solid retro-reflectors. In this design, the outer glass surfaces will be coated with an enhanced aluminum coating for high reflectivity in the H-band. FIG. 5B also indicates how a larger 640×512 array is separated into the three distinct regions for the different apertures with the pyramid mirror. Only two regions 40A and 40B are shown. Each individual aperture uses approximately ⅓ the entire array area with an effective field of view of a 0.55 degree square (or 0.62 degree circular).

Another aperture combining technique investigated by Applicants involves the use of bent fiber image conduit. This requires the infrared camera to be modified so that the thermoelectric cooler package (that normally has a window in front of the array) would be replaced with a fiber window bonded directly to the array. Due to this additional expense, the pyramid mirror technique was selected as the preferred aperture combiner for the alternative preferred embodiment.

Marine Environment

A marine environment provides the challenge of the sensor operating autonomously over large variations in humidity and temperature, along with requiring additional protection from condensation and corrosion due to fog and saline conditions. Some of the modifications that could be required would be to change the lens housing or mechanical structure material to lower the coefficient of thermal expansion in order to maintain the system focus while operating over an increased temperature range. Additionally, the sensor covering will be reviewed to provide for increased weatherproofing protection for the optical system. The lens assembly is preferably designed so that the system can be nitrogen purged which will prevent condensation on the internal surfaces of the optics. Similarly, the entire sensor head could also be nitrogen purged or a desiccant material placed internally to reduce condensation. A large mechanical shutter assembly is preferably placed on each of the three lens apertures to provide protection of the optics during periods of rain, ice, or snow, fog when the system would be prevented from operating due to poor atmospheric transmission.

To increase the reliability and maintainability of the unit while deployed at sea, several other designs should be considered. The wire cabling connection between the sensor head and electronics can be redesigned to use a single fiber optic cable. This could be an important upgrade for the sensor head to improve reliability and ruggedness while reducing the possible electromagnetic interference from external shipboard hardware such as radars. To improve the maintainability of the sensor, an increased set of built-in diagnostic capabilities could be implemented for a deployed system. This would also include an autonomous calibration diagnostic that can be run during favorable atmospheric conditions (clear night time) when the probability of observing several stars in each aperture is high. This diagnostic would recalibrate the line of sight of each of the apertures with respect to each other and the inclinometer by knowing the ship location via GPS. In this way, the system could autonomously calibrate out small thermal and/or mechanical drifts during periods of opportunity to increase the system reliability, maintainability and accuracy. The accuracy of the local horizon measurements using the inclinometer will require review. Specifically, the update rate requirement along with the suppression of angular acceleration effects should be reviewed. The addition of angular rate sensors may be required to permit removal of platform motion effects in multiple frame averages.

Aircraft Issues

Peculiarities of the present invention for the aircraft include:
a) Effect of atmospheric obscurants including clouds is reduced (50% probability of clear line of site at sea level, and 90% probability at 30,000 ft). The use of multiple measurement channels increases the probability of clear line of sight;
b) Daytime sky background is reduced by a factor of 10 for every 20,000 ft;
c) Simultaneous measurements with four optical channels may be preferred to reduce the effect of aircraft vibration and motion;

d) Short exposure time (1 msec or lower) may be required to prevent star blurring due to aircraft vibration; and e) A multiple-frame averaging technique should be used to reduce noise and increase the signal to noise ratio in the imagery data.

For the aircraft application, it is likely important to reduce the size and weight of the unit while also having an increased vibrational operating specification for the sensor. Due to reduced sky background at altitude, the sensor apertures could be designed for a smaller diameter with a shorter focal length to maintain the same f-number. Similarly, the mechanical structure could be designed with composite materials to increase stiffness and reduce susceptibility in a harsh vibrational environment, lower sensor head weight, and reduce the system thermal susceptibility.

Although the present invention has been described above in terms of specific preferred embodiments persons skilled in this art will recognize that many changes and variations are possible without deviation from the basic invention. For example, platform position can be determined with only two telescopes. With three telescopes at least two will always be pointed more than 30 degrees away from the sun. If only two telescopes are used, preferably they would be mounted with a 90 degree azimuthal separation at an elevation of 45 degrees to the horizon. There could also be situations where four telescopes would be preferred. Many infrared sensors other than the ones specifically referred to are available for operation in the transmission windows shown as 4 and 6 in FIG. 2A. The systems could have applications other than ship or airplane navigation. Various addition components could be added to provide additional automation to the system and to display position information. Star catalogs may include celestial objects other than stars such as planets and asteroids. Otherwise, if one of these objects shows up in an image, it could confuse the system. Accordingly, the scope of the invention should be determined by the appended claims and their legal equivalents.

We claim:

1. An automatic celestial navigation system for navigating both night and day by observation of K-band or H-band infrared light from multiple stars, said system comprising:
    A) at least two telescopes each of said at least two telescopes rigidly mounted with respect to each other and rigidly mounted on a movable platform with each telescope being directed at a substantially different portion of sky with each of said telescopes defining a field of view and comprising:
        1) telescope optics for focusing H-band or K-band light from stars in said field of view onto a focal plane,
        2) a sensor located at said focal plane for detecting H-band or K-band light,
    B) an accurate timing device,
    C) an inclination sensor,
    D) a computer processor having access to infrared star charts, programmed to compare image data from said infrared sensors, time information from said timing device, incline information from said inclination sensor and said star charts to determine positions of said platform and
    E) a display device for displaying positions of said platform.

2. The system as in claim 1 wherein said at least two telescopes are three telescopes.

3. The system as in claim 2 and further comprising temperature and pressure sensors wherein said processor is also programmed to utilize information from said temperature and pressure sensors to correct for variations caused by changing temperature and pressure.

4. The system as in claim 2 wherein each of said telescopes are pointed in azimuthal directions spaced at about 120 degrees relative to each other and at about 45 degrees relative to horizontal.

5. The system as in claim 2 wherein said system is integrated with an inertial guidance system.

6. The system as in claim 2 wherein said platform is a ship or a portion of a ship.

7. The system as in claim 2 wherein said platform is a ship or a portion of an airplane.

8. The system as in claim 2 wherein each of said sensors have full well capacities in excess of 5 million electrons.

9. The system as in claim 2 wherein each of said sensors have a frame readout period of less than 30 milliseconds.

10. The system as in claim 2 wherein each of said telescopes have a pixel size of about 6 arc-seconds.

11. The system as in claim 2 wherein said processor is programmed to detect stars in the presence of strong background noise and to reduce noise, by utilizing multiple individual frames that are aligned to a star image in a single frame and summed up.

12. (previously amended) The system as in claim 2 wherein sizes of search windows are determined by the root mean square error of measurements of local verticals with an inclinometer.

13. (previously amended) The system as in claim 2 wherein stars are identified using angular distances between stars, star relative brightness and triangle patterns.

14. (previously amended) The system as in claim 2 wherein each of said telescopes have an instantaneous field of view of about 0.4×0.5 degrees.

15. The system as in claim 2 wherein said processor is programmed to determine position utilizing the following steps:
    A) to reduce the fixed pattern camera noise, considering the data set that consists of 20 frames and first, using 20 data frames that precede the first frame in the data set, the median data frame is calculated to determine a background threshold for each pixel, then, the median frame of pixels is subtracted from each frame in the data set, pixel by pixel;
    B) next, to reduce noise, five sequential data frames in the data set are blindly summed up to spreads star illumination over a few pixels;
    C) then a "super pixeled" image is created by down sampling the image generated in step B at the rate of 1:4 with four adjacent pixels being summed across the pixel array;
    D) determine the brightest super pixel in the frame where the star can be located and create a small (9×9 regular pixel size) window about the brightest super-pixel location (81 pixels with the brightest 4×4 in the middle);
    E) to increase the centroid accuracy, up sample the image within the window at the rate 10:1 using cubic spline fit algorithm image at the noise ceiling (i.e., the computer produces a digital array of 90×90 virtual pixels and fits them with the cubic spline fit algorithm into a Gaussian-like shape);
    F) calculate the intensity weighted centroid to determine an expected star location in the first data frame;
    G) repeat steps B)-F) for each subsequent data frames in the data set;

H) once an expected star location in all subsequent data frames are determined, shift all 20 frames to the star position in the first frame, and sum up all frames to create a final image for the entire frame, based on the shifts obtained from the 9×9 pixel centroiding window, the extent of the shift is being based on the location of the centroid;

I) create a "super pixel" representation of the shifted and added frame obtained from step 8 by down sampling at the rate of 1:4 (i.e., four adjacent pixels are summed across the pixel array), determine brightest super pixel and create a small (9×9 regular pixel size) window about that location;

J) up sample the image within the small 9×9 pixel window with a ratio of 10:1 by using cubic spline fit algorithm, remove background by chopping at noise ceiling, calculate intensity weighted centroid position as well as total intensity in the image, make an estimation of the rms noise by taking the standard deviation $\sigma$ of all pixels, other than pixels illuminated by bright stellar objects, in the entire image frame, remove the data within the small window in order to search for the next dimmest star, repeat steps I and J until all potential stellar objects within the frame are found;

K) for each potential star location, the pixel SNR is calculated:

$$SNR = \frac{I_S - \langle I \rangle}{\sigma},$$

where $I_s$ is the total signal intensity divided by number of pixels in the image, $\langle I \rangle$ is the mean intensity in the image, and $\sigma$ is the rms noise and if the SNR$\geq$10, then the star is detected and the star coordinates are determined by intensity weighted centroid calculated in step J) but if SNR<10, then this potential star location is rejected and treated as a noise; and L) star coordinates along with the star intensity are used further by automated star pattern recognition algorithm and coordinates of the brightest star in the field of view are used in calculations of latitude, longitude and absolute azimuth.

16. The system as in claim 2 wherein the system is integrated with an inertial navigation system using a Kalman filter.

* * * * *